United States Patent
Atur

(10) Patent No.: US 7,836,052 B2
(45) Date of Patent: Nov. 16, 2010

(54) SELECTION OF ATTRIBUTE COMBINATION AGGREGATIONS

(75) Inventor: Balachandran K. Atur, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 194 days.

(21) Appl. No.: 11/391,079

(22) Filed: Mar. 28, 2006

(65) Prior Publication Data

US 2007/0239657 A1 Oct. 11, 2007

(51) Int. Cl.
G06F 17/30 (2006.01)

(52) U.S. Cl. ............... 707/737; 707/752; 707/999.006; 707/999.101

(58) Field of Classification Search ............... 707/1–10, 707/100–102, 200, 737, 752, 999.001, 999.003, 707/999.006, 999.007, 999.01, 999.1, 999.101, 707/999.102; 705/1
See application file for complete search history.

(56) References Cited

U.S. PATENT DOCUMENTS

| | | | |
|---|---|---|---|
| 6,839,680 B1 * | 1/2005 | Liu et al. ...................... 705/10 |
| 7,194,451 B2 * | 3/2007 | Chaudhuri et al. ............. 707/2 |
| 2004/0088275 A1 * | 5/2004 | Elder et al. ..................... 707/1 |
| 2004/0117222 A1 * | 6/2004 | Rokosz et al. .................. 705/7 |
| 2007/0143132 A1 * | 6/2007 | Linne et al. .................... 705/1 |
| 2008/0189632 A1 * | 8/2008 | Tien et al. ................... 715/764 |

* cited by examiner

Primary Examiner—Marc R Filipczyk

(57) ABSTRACT

Implementations of various technologies and techniques for method for selecting an interesting attribute combination aggregation. In one implementation, an attribute combination aggregation may be generated. One or more values in the attribute combination aggregation may be statistically analyzed. The attribute combination aggregation may be determined as interesting based on the statistical analysis. The interesting attribute combination aggregation may then be stored.

13 Claims, 2 Drawing Sheets

SELECTION OF ATTRIBUTE COMBINATION AGGREGATIONS

BACKGROUND

Online analytical processing (OLAP) is a key part of most data warehouse and business analysis systems. OLAP services provide for fast analysis of multidimension information. For this purpose, OLAP services provide for multidimensional access and navigation of data in an intuitive and natural way, providing a global view of data that can be drilled down into particular data of interest. Speed and response time are important attributes of OLAP services that allow users to browse and analyze data online in an efficient manner. Further, OLAP services typically provide analytical tools to rank, aggregate and calculate lead and lag indicators for the data under analysis.

Databases are commonly queried for aggregations (e.g., summaries, minimums, maximums, counts and the like) of detail data rather than individual data items. For example, a user may want to know sales data for a given period of time without regard to geographical distinctions. These types of queries may be efficiently answered through aggregations. Aggregations are pre-computed summaries of selected detail data that allow an OLAP system or a relational database to quickly respond to queries by avoiding collecting and aggregating detailed data during query execution. Without aggregations, the system would need to scan all of the rows containing the detailed data to answer these queries, resulting in substantial processing delays. With aggregations, the system computes and materializes aggregations ahead of time so that when the query is submitted to the system, the appropriate aggregation already exists and can be sent to the user much more quickly. Calculating these aggregations, however, can be costly, both in terms of processing time and in terms of disk space consumed.

Multidimensional aggregations may be represented in cubes. A cube is a multidimensional database that represents data similar to a 3-D spreadsheet rather than a relational database. The cube allows different views of the data to be displayed quickly by employing concepts of dimensions and measures. Dimensions define the structure of the cube, e.g., geographical location or a product type, while measures provide the quantitative values of interest to the end user, e.g., sales dollars, inventory amount, and total expenses.

Multidimensional aggregations in cubes have a number of problems. Typically, end users are required to issue queries to find information that may be of interest to them. These queries may be based on the end users' prior experience with the business or other ad-hoc criteria. In situations where prior experience is not pertinent (or non existent) and where no useful ad-hoc criteria exists, the end users may end up spending hours in coming up with various types of queries by trial and error to find information that may be of interest to them. Wading through large numbers of aggregations to identify aggregations of interest may be frustrating to the end users.

SUMMARY

Described here are implementations of various technologies and techniques for method for selecting an interesting attribute combination aggregation. In one implementation, an attribute combination aggregation may be generated. One or more values in the attribute combination aggregation may be statistically analyzed. The attribute combination aggregation may be determined as interesting based on the statistical analysis. The interesting attribute combination aggregation may then be stored.

In another implementation, after the attribute combination aggregation has been generated, one or more values in the attribute combination aggregation may be examined as to whether they would fall within a predetermined boundary of a standard deviation. If the one or more values fall outside the predetermined boundary of the standard deviation, then the attribute combination aggregation may be determined as interesting.

In yet another implementation, after the attribute combination aggregation has been generated, the ratio between the maximum values and the minimum values in the attribute combination aggregation may be examined as to whether it exceeds a predetermined value. If the ratio between the maximum values and the minimum values exceeds the predetermined value, then the attribute combination aggregation may be determined as interesting.

The claimed subject matter is not limited to implementations that solve any or all of the noted disadvantages. Further, the summary section is provided to introduce a selection of concepts in a simplified form that are further described below in the detailed description section. The summary section is not intended to identify key features or essential features of the claimed subject matter, nor is it intended to be used to limit the scope of the claimed subject matter.

DETAILED DESCRIPTION

To facilitate user navigation of the large number of aggregations, implementations of various technologies described herein are directed to generation of intelligent attribute combination aggregations. Aggregations may be retained only for those attribute combinations that are likely to convey useful information to the user. The following example illustrates the manner in which aggregations are generated may determine whether the aggregations would be interesting or not. TABLE 1 illustrates the sales of widgets (W#) during various time periods (T#).

TABLE 1

|  | T1 | T2 | T3 | T4 | T5 | T6 | Total T |
|---|---|---|---|---|---|---|---|
| W1 | 100 | 107 | 111 | 110 | 119 | 120 | 667 |
| W2 | 50 | 45 | 40 | 40 | 35 | 30 | 240 |
| W3 | 20 | 18 | 19 | 20 | 16 | 20 | 113 |
| Total W | 170 | 170 | 170 | 170 | 170 | 170 | |

When aggregations are taken along the widget dimension while keeping time period dimension at the lowest granularity, it may be observed that sales of widgets across all time periods are the same, i.e., 170 units. On the other hand, when the aggregations are taken along the time dimension for each widget, it may be observed that sales of widgets W1 are on the upswing and are compensating for the loss of sales of widgets W2 and W3. Thus, aggregations generated along the time dimension for each widget may be more interesting to the user than aggregations generated along the widget dimension while keeping the time period dimension at the lowest granularity.

Figure 1:
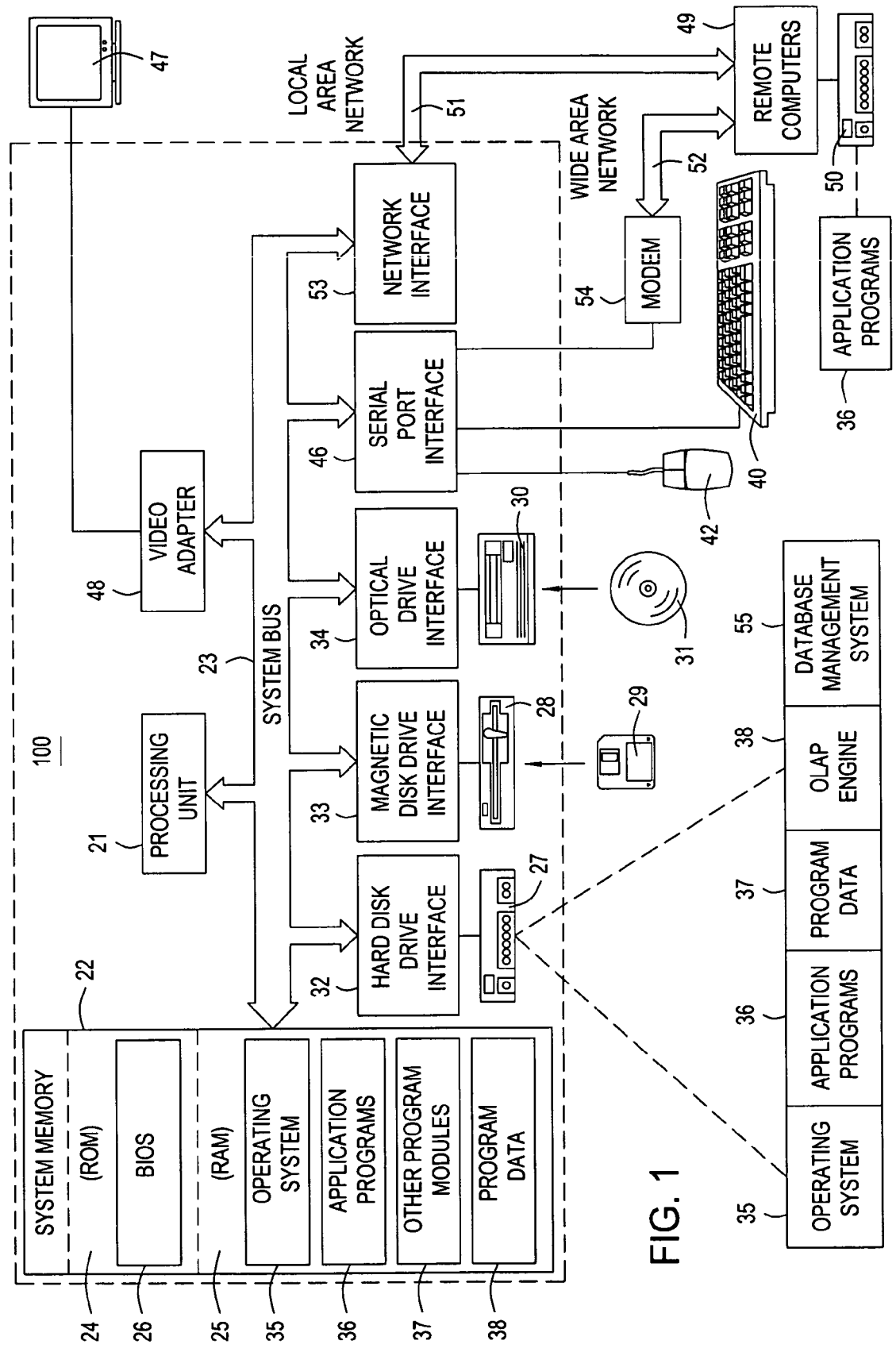
FIG. 1 illustrates a schematic diagram of a computing system in which various technologies described herein may be incorporated and practiced.

FIG. 1 illustrates a schematic diagram of a computing system 100 in which various technologies described herein may be incorporated and practiced. The computing system 100 may be a conventional desktop or a server computer. However, those skilled in the art will appreciate that implementations of various technologies described herein may be practiced in other computer system configurations, including hypertext transfer protocol (HTTP) servers, hand-held devices, multiprocessor systems, microprocessor-based or programmable consumer electronics, network PCs, minicomputers, mainframe computers, and the like. Some implementations may be practiced in distributed computing environments where tasks are performed by local and remote processing devices that are linked through a communications network, e.g., by hardwired links, wireless links, or combinations thereof. In a distributed computing environment, program modules may be located in both local and remote memory storage devices.

Referring back to FIG. 1, the computing system 100 may include a central processing unit (CPU) 21, a system memory 22 and a system bus 23 that couples various system components including the system memory 22 to the CPU 21. The system bus 23 may be any of several types of bus structures, including a memory bus or memory controller, a peripheral bus, and a local bus using any of a variety of bus architectures. The system memory 22 may include a read only memory (ROM) 24 and a random access memory (RAM) 25. A basic input/output system (BIOS) 26, containing the basic routines that help transfer information between elements within the computing system 100, such as during start-up, may be stored in the ROM 24. Although only one CPU is illustrated in FIG. 1, it should be understood that in some implementations the computing system 100 may include more than one CPU.

The computing system 100 may further include a hard disk drive 27 for reading from and writing to a hard disk, a magnetic disk drive 28 for reading from or writing to a removable magnetic disk 29 and an optical disk drive 30 for reading from or writing to a removable optical disk 31, such as a CD ROM or other optical media. The hard disk drive 27, the magnetic disk drive 28, and the optical disk drive 30 may be connected to the system bus 23 by a hard disk drive interface 32, a magnetic disk drive interface 33, and an optical drive interface 34, respectively. The drives and their associated computer-readable media may provide nonvolatile storage of computer-readable instructions, data structures, program modules and other data for the computing system 100. Although the computing system 100 is described herein as having a hard disk, a removable magnetic disk 29 and a removable optical disk 31, it should be appreciated by those skilled in the art that the computing system 100 may also include other types of computer-readable media that may be accessed by a computer. For example, such computer-readable media may include computer storage media and communication media. Computer storage media may include volatile and non-volatile, and removable and non-removable media implemented in any method or technology for storage of information, such as computer-readable instructions, data structures, program modules or other data. Computer storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the computing system 100.

A number of program modules may be stored on the hard disk, magnetic disk 29, optical disk 31, ROM 24 or RAM 25, including an operating system 35, one or more application programs 36, program data 37 and an online analytical processing (OLAP) engine 37 and a database management system (DBMS) 55. The operating system 35 may be any suitable operating system that may control the operation of a networked personal or server computer, such as Windows® XP, Mac OS® X, Unix-variants (e.g., Linux® and BSD®), and the like. The OLAP engine 37 and the database management system 55 will be described in more detail in the paragraphs below with reference to FIGS. 2 and 3.

A user may enter commands and information into the computing system 100 through input devices such as a keyboard 40 and pointing device 42. Other input devices may include a microphone, joystick, game pad, satellite dish, scanner, or the like. These and other input devices may be connected to the CPU 21 through a serial port interface 46 coupled to system bus 23, but may be connected by other interfaces, such as a parallel port, game port or a universal serial bus (USB). A monitor 47 or other type of display device may also be connected to system bus 23 via an interface, such as a video adapter 48. In addition to the monitor 47, the computing system 100 may further include other peripheral output devices, such as speakers and printers.

As briefly mentioned above, the computing system 100 may operate in a networked environment using logical connections to one or more remote computers, such as a remote computer 49. The remote computer 49 may be another personal computer, a server, a router, a network PC, a peer device or other common network node. Although the remote computer 49 is illustrated as having only a memory storage device 50, it should be understood that the remote computer 49 may include many or all of the elements described above relative to the computing system 100. The logical connections may be any connection that is commonplace in offices, enterprise-wide computer networks, intranets, and the Internet, such as local area network (LAN) 51 and a wide area network (WAN) 52.

When using a LAN networking environment, the computing system 100 may be connected to the local network 51 through a network interface or adapter 53. When used in a WAN networking environment, the computing system 100 may include a modem 54 or other means for establishing communication over wide area network 52, such as the Internet. The modem 54, which may be internal or external, may be connected to the system bus 23 via the serial port interface 46. In a networked environment, program modules depicted relative to the computing system 100, or portions thereof, may be stored in a remote memory storage device 50. It will be appreciated that the network connections shown are exemplary and other means of establishing a communications link between the computers may be used.

Figure 2:
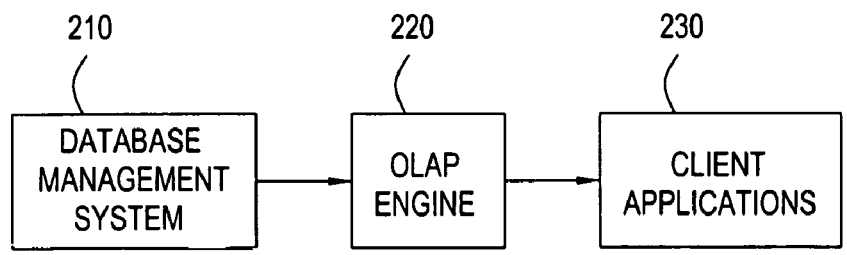
FIG. 2 illustrates the relationship between an OLAP engine and a database management system in accordance with implementations of various technologies described herein.

FIG. 2 illustrates the relationship between an OLAP engine 210 and a database management system 220 in accordance with implementations of various technologies described herein. In one implementation, the OLAP engine 210 may be configured to read data from the database management system 220 and generate one or more aggregations that may be of interest to the end user. The client applications 230 may be configured to display those aggregations to the end user.

The database management system 210 may be configured to process queries, such as, to retrieve, insert, delete, and/or modify data in a database (not shown). A user query typically includes a selection of data from the database. For example, a simple user query may inquire about how many records fall between the values represented by certain endpoints, designated RANGEHIGH and RANGELOW. Other, more complicated queries may involve joins of numerous attributes, and even more complicated queries may have simple selection queries imbedded within them. The database management system 200 may support any suitable query language, such as Structured Query Language (SQL), to define the queries that may be processed.

The OLAP engine 220 may be defined as a high-capacity, multi-user data manipulation engine specifically designed to support and operate on multidimensional data structures. Each multidimensional structure may be arranged so that every data item may be located and accessed based on the intersection of the dimension members which define that item. The OLAP engine 210 may be configured for rapid ad-hoc information retrieval in any orientation, as well as for fast, flexible calculation and transformation of raw data based on formulaic relationships. The OLAP engine 210 may either physically stage the processed multidimensional information to deliver consistent and rapid response times to end users (commonly referred to as MOLAP), or it may populate its data structures in real time from relational or other databases (commonly referred to as ROLAP), or offer a choice of both (commonly referred to as HOLAP). Implementations of various technologies described herein may be used with any of these three types of OLAP engines.

Figure 3:
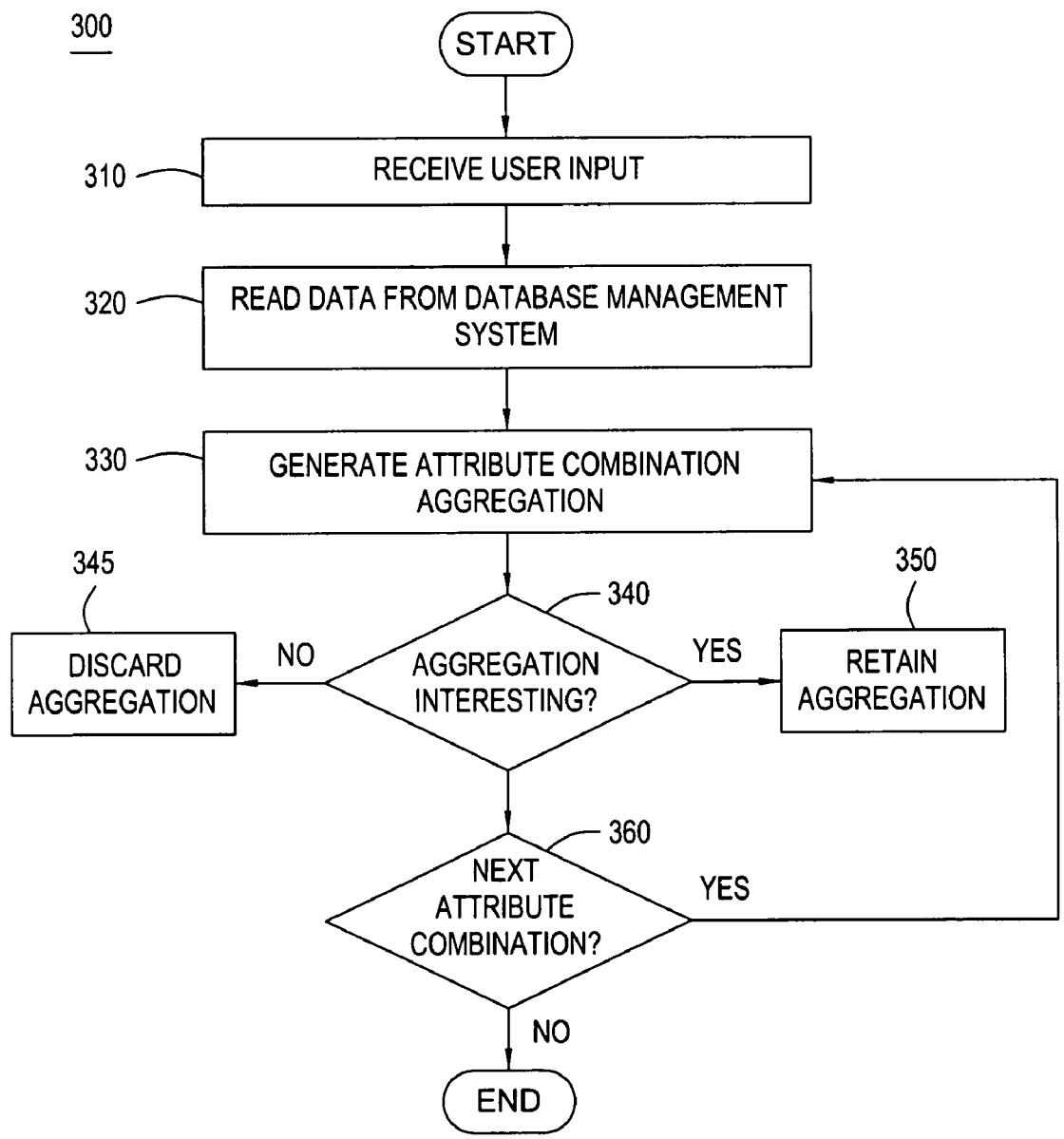
FIG. 3 illustrates a flow diagram of a method for generating one or more aggregations in accordance with implementations of various technologies described herein.

FIG. 3 illustrates a flow diagram of a method 300 for generating one or more aggregations in accordance with implementations of various technologies described herein. In one implementation, the OLAP engine 38 receives a command from a user to generate one or more aggregations (step 310). In addition to the command, the user may also provide one or more dimensions, one or more attributes and one or more statistical techniques to be used for generating the aggregations. A dimension may be defined as a structural attribute of a cube that is a list of members, all of which are of a similar type in the user's perception of the data. Typically, there is a hierarchy associated with the dimension. For example, a time dimension may consist of days, weeks, months and years, while a geography dimension may consist of cities, state/provinces and countries. The entities of which a dimension is constituted are commonly referred to as attributes. As such, an attribute may be defined as a fact describing each position or value of a dimension. An attribute combination is a combination of attributes from one or more dimensions. For example, DAY-CITY is an attribute combination involving the DAY attribute from the TIME dimension and the CITY attribute from the GEOGRAPHY dimension.

Upon receipt of the user input, the OLAP engine 38 reads the data associated with the user input from the database management system 55 (step 320). In one implementation, if the user has provided no input regarding dimensions or attributes, then all the data from the database management system 55 may be read. The data may be stored into a database, such as Microsoft® SQL Server™ Analysis Services. Such database may be created and maintained by the OLAP engine 38. Although implementations of various technologies are described herein with reference to a database management system, it should be understood that some implementations may use other types of storage systems, such as disk files.

At step 330, a first attribute combination aggregation is generated. As previously mentioned, an aggregation is a pre-computed summary of selected detail data that allows an OLAP system or a relational database to quickly respond to queries by avoiding collecting and aggregating detailed data during query execution. Without aggregations, the system would need to scan all of the rows containing the detailed data to answer these queries, resulting in substantial processing delays. With aggregations, the system computes and materializes aggregations ahead of time so that when the query is submitted to the system, the appropriate aggregation already exists and can be sent to the user much more quickly. For example, if the CUSTOMER dimension has attributes CUSTOMER NAME, CITY and STATE and the TIME dimension has attributes YEAR, QUARTER, MONTH AND DAY, the first attribute combination to be considered may be CUSTOMER NAME and MONTH. Generating an aggregation for this attribute combination involves finding the month that each day belongs to and aggregating the value from each day to the corresponding month. For example, to generate the value corresponding to the attribute combination CUSTOMER NAME-MONTH, the OLAP engine would typically aggregate the values in each day in January for a particular customer name and arrive at the aggregation for that name and month combination. This would be done for every month and name combination. The set of generated values is the set of aggregations for the month-name attribute combination.

The term aggregation is used herein to refer to a set of techniques that may include (but are not restricted to) sum, average, min, max and the like. For measures such as INVENTORY, the values from January would probably be averaged or the minimum or maximum value taken. For other measures, such as SALES, a simple sum may be generated. The aggregation technique (i.e., sum, average and the like) is typically specified by the administrator who is creating the OLAP database and is usually based on inputs from business professionals who need to analyze the data. In one implementation, the user may provide information regarding the particular dimensions to be evaluated, the order in which those dimensions are to be evaluated, the particular attributes within those dimensions to be evaluated and the order in which those attributes are to be evaluated. In such an implementation, the aggregations will be generated based on the user input. Otherwise, the aggregations may be generated in order, such as, numerical, alphabetical, ascending, descending and the like.

Once the first attribute combination aggregation is generated, a determination is made as to whether the first attribute combination aggregation is interesting (step 340). A number of statistical techniques may be used to make this determination. In one implementation, if all the values in the aggregation fall within a certain bound of a standard deviation, then it may be determined that the aggregation is uninteresting and thus may be discarded (step 345). In another implementation, the aggregation may be retained for future use in generating other aggregations. For example, an aggregation that is generated for the CITY and SKU combination may be determined as uninteresting; however, this aggregation may be useful for generating the aggregation for the STATE and SKU combination in an efficient fashion.

In yet another implementation, if all the values in the aggregation fall outside of the standard deviation, i.e., widely dispersed, then it may be determined that the first attribute combination aggregation is interesting and thus may be retained for display to the user (step 350). In addition to using a standard deviation, other statistical techniques may be used to determine whether an aggregation is interesting. For example, if the ratio between the maximum and minimum values exceeds a certain threshold, then it may be determined that the aggregation is interesting. As another example, if the difference between the maximum value and the minimum value exceeds a certain threshold, then it may be determined that the aggregation is interesting. In one implementation, if the user provided certain statistical techniques to be used for performing this determination step, then those statistical techniques will be used to make the determination.

At step 360, a determination is made as to whether there is another attribute combination aggregation to be generated. If there is still another aggregation to be generated, then processing returns to step 330. In this manner, all the desired attribute combinations may be generated and examined according to steps 330-350. In one implementation, the user may specify the maximum number of attribute combination aggregations to be generated. In another implementation, the user may specify a predetermined number of attribute combination aggregations to be generated. In this implementation, aggregations for the first predetermined number of attribute combinations may be generated and processed according to steps 330-350. In yet another implementation, the user may specify certain attributes as not participating in the aggregation generation. In still yet another implementation, the user may specify certain attributes as the only attributes in a dimension that need to be considered for aggregation generation.

In this manner, various implementations described herein may be configured to provide as much useful information to the user as possible while reducing the amount of data that the user has to wade through. Useful in this context may refer to aggregations that may be of interest to the user.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for displaying an interesting subset of a plurality of aggregations of data comprising:
    preprocessing the plurality of aggregations by an online analytical processing (OLAP) engine designed to operate on multidimensional data structures, the preprocessing comprising:
        receiving from a server a plurality of dimensions, a first order in which the dimensions are to be evaluated, a plurality of attributes, and a second order in which the attributes are to be evaluated, wherein the dimensions, the attributes, the first order and the second order describe properties of the plurality of aggregations;
        generating the plurality of aggregations based on the plurality of dimensions, the plurality of attributes, the first order and the second order received from said server;
        statistically analyzing and identifying a subset of the plurality of aggregations as the interesting subset of the plurality of aggregations, wherein each aggregation in the interesting subset has (i) one or more values that fall outside a predetermined boundary of a standard deviation, (ii) a ratio between one or more maximum values and one or more minimum values that exceeds a first predetermined value, and (iii) a difference between the maximum values and the minimum values that exceeds a second predetermined value;
    storing the interesting subset of the plurality of aggregations in a database;
    analyzing the plurality of aggregations based on a received query; and
    displaying the interesting subset of the plurality of aggregations in response to the received query.

2. The method of claim 1, wherein preprocessing the plurality of aggregations further comprises identifying a subset of the plurality of aggregations as an uninteresting subset, wherein each aggregation in the uninteresting subset has one or more values that fall within the predetermined boundary of the standard deviation.

3. The method of claim 2, further comprising discarding the uninteresting subset.

4. The method of claim 2, further comprising retaining the uninteresting subset for future generation of aggregations.

5. The method of claim 1, further comprising reading data from a database management system in response to receiving the dimensions and the attributes.

6. The method of claim 1, wherein the plurality of aggregations is generated by the (OLAP) engine configured to provide rapid ad-hoc information retrieval.

7. The method of claim 6, wherein the online analytical processing engine is a high-capacity, multi-user data manipulation engine designed to support and operate on one or more multidimensional data structures.

8. The method of claim 7, wherein each multidimensional data structure is arranged such that each datum in the data is located and accessed based on an intersection of the dimensions that defines a corresponding datum.

9. The method of claim 1, wherein the dimensions comprise a geographical location, a time or a product type.

10. The method of claim 1, wherein the attributes comprise a measurement unit of the geographical location, the time, or the product type.

11. A computer-readable medium including computer storage media having stored thereon computer-executable instructions which, when executed by a computer, cause the computer to:
    preprocess a plurality of aggregations by an online analytical processing (OLAP) engine designed to operate on multidimensional data structures, the preprocess comprising:
        receiving from a server a plurality of dimensions, a first order in which the dimensions are to be evaluated, a plurality of attributes, and a second order in which the attributes are to be evaluated, wherein the dimensions, the attributes, the first order and the second order describe properties of the plurality of aggregations;
        generating the plurality of aggregations based on the plurality of dimensions, the plurality of attributes, the first order and the second order received from said server;
        statistically analyzing and identifying a subset of the plurality of aggregations as an interesting subset of the plurality of aggregations, wherein each aggregation in the interesting subset has (i) one or more values that fall outside a predetermined boundary of a standard deviation, has (ii) a ratio between one or more maximum values and one or more minimum values that exceed a first predetermined value, and (iii) a difference between the maximum values and the minimum values that exceeds a second predetermined value;

storing the interesting subset of the plurality of aggregations in a database;

analyzing the plurality of aggregations based on a received query; and display the interesting subset of the plurality of aggregations in response to the received query.

12. The computer-readable medium of claim 11, wherein the computer-executable instructions which, when executed by a computer, cause the computer to preprocess the plurality of aggregations further comprises computer-executable instructions configured to identify a subset of the plurality of aggregations as an uninteresting subset, wherein each aggregation in the uninteresting subset has one or more values that fall within a predetermined boundary of a standard deviation.

13. A computer system, comprising:

a processor; and a memory comprising program instructions executable by the processor to:

preprocess a plurality of aggregations by an online analytical processing (OLAP) engine designed to operate on multidimensional data structures, the preprocess comprising:

receiving from a server a plurality of dimensions, a first order in which the dimensions are to be evaluated, a plurality of attributes, and a second order in which the attributes are to be evaluated, wherein the dimensions, the attributes, the first order and the second order describe properties of the plurality of aggregations;

generating the plurality of aggregations based on the dimensions, the attributes, the first order and the second order received from said server;

statistically analyzing and identifying a subset of the plurality of aggregations as an interesting subset, wherein each aggregation in the interesting subset has (i) one or more values that fall outside a predetermined boundary of a standard deviation, (ii) a ratio between one or more maximum values and one or more minimum values that exceeds a first predetermined value, and (iii) a difference between one or more maximum values and one or more minimum values that exceeds a second predetermined value; and store the interesting subset of the plurality of aggregations in a database;

analyzing the plurality of aggregations in response to a received query; and display the interesting subset of the plurality of aggregations in response to the received query.

* * * * *